July 6, 1943.     E. PELL     2,323,485
CONTROL MEANS FOR SYNCHRONOUS DYNAMO-ELECTRIC MACHINES
Filed July 3, 1942     2 Sheets—Sheet 1
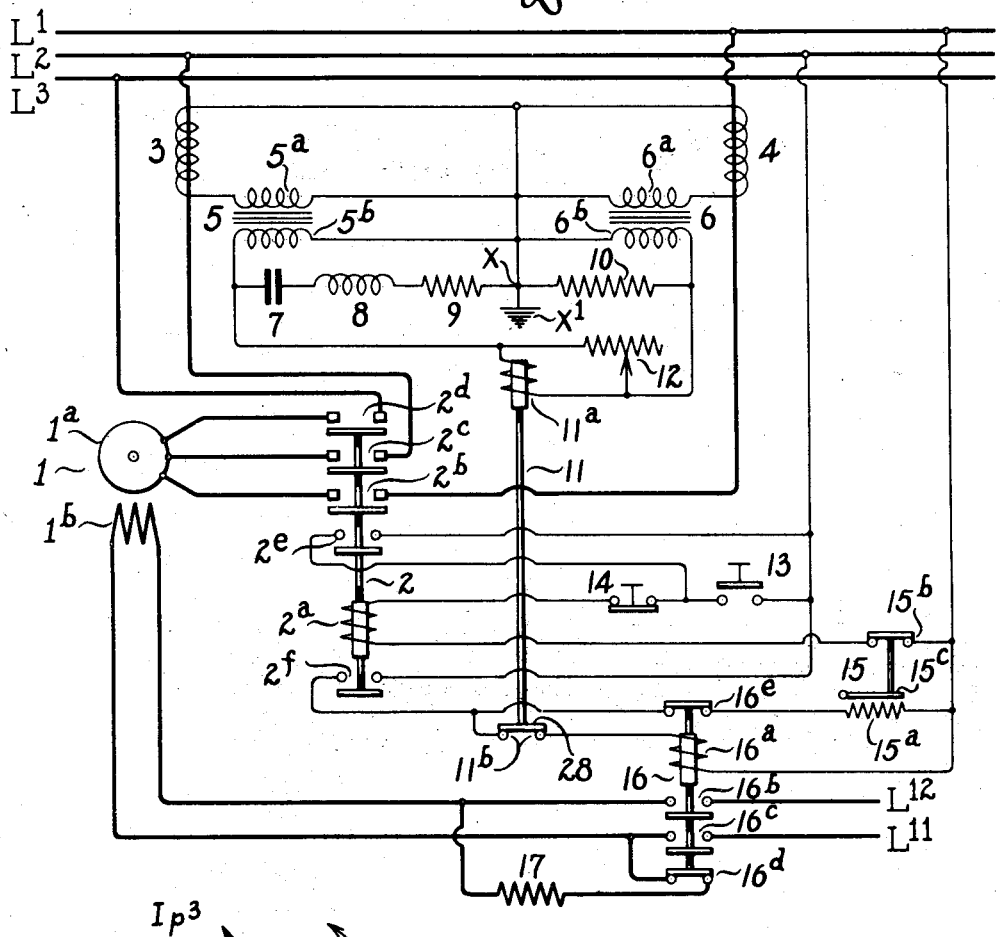
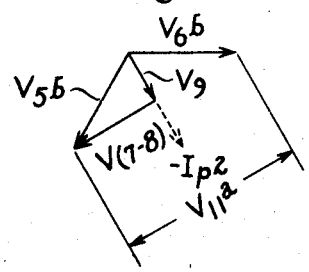
Inventor
Eric Pell
By Frank H. Hubbard
Attorney July 6, 1943.　　　　　　　E. PELL　　　　　　　2,323,485
CONTROL MEANS FOR SYNCHRONOUS DYNAMO-ELECTRIC MACHINES
Filed July 3, 1942　　　　2 Sheets-Sheet 2

Inventor
Eric Pell
By Frank H. Hubbard
Attorney

318. ELECTRICITY, MOTIVE POWER SYSTEMS

UNITED STATES PATENT OFFICE 2,323,485

CONTROL MEANS FOR SYNCHRONOUS DYNAMOELECTRIC MACHINES

Eric Pell, Milwaukee, Wis., assignor to Cutler-Hammer, Inc., Milwaukee, Wis., a corporation of Delaware Application July 3, 1942, Serial No. 449,596

10 Claims. (Cl. 172—289)

This invention relates to control means for synchronous dynamo-electric machines, and particularly to the control of the direct current excitation of a synchronous dynamo-electric machine which is started by supplying alternating current to its armature winding, while its field winding is short-circuited, and which field winding is connected to a direct current power supply as the machine approaches synchronous speed, whereupon the machine pulls into synchronism.

The system incorporating the invention is especially applicable to the control of salient pole synchronous machines, as it not only provides for automatically connecting the exciting or field winding of the machine to the direct current source of excitation, when upon starting the machine has attained a sufficiently high speed to insure that it will synchronize after the field is excited, but it also provides for the temporary disconnection of the field winding from its source of supply, if the machine during normal operation at synchronous speed, through overload or other causes, should fall out of step. In such event the system further provides for the reconnection of the field excitation circuit to the direct current source, if the machine subsequently accelerates again to a sufficiently high speed to permit reclosure of the field excitation circuit for synchronization of the machine.

The present invention provides for the automatic excitation of the field circuit of a synchronous dynamo-electric machine in response to variations in the sequence current, when the machine approaches synchronous speed and for opening of the field switch to disconnect the field circuit of the machine if the latter pulls out of step due to any cause.

The invention is based upon the well known fact that in a polyphase synchronous dynamo-electric machine having salient field poles and a damper winding, the pole winding and the damper winding are asymmetrical with respect to the symmetrical polyphase primary or armature winding and may be regarded with respect to the latter as an equivalent two-phase winding.

The magnetic coupling or ratio of transformation of this two-phase winding with respect to the different phases of the primary winding varies with the angular position of the field poles relatively to the armature, so that the apparent impedances of the various phases of the armature winding differ from each other. This in turn causes the currents in the various phases of the armature winding to differ from each other. If now the machine starts to accelerate, the inductive effect of the equivalent two-phase secondary winding upon the primary winding induces in the various phases of the latter alternating voltages and these in turn produce sequential pulsations which are superimposed upon the currents in the various phases of the primary winding.

These superimposed pulsating currents may be resolved into two separate polyphase current components, one of which rotates at synchronism with and in the same direction as the applied line voltage and may be called the positive sequence current. The other component rotates in a direction opposite to that of the applied voltage and may be called the negative sequence current.

When the machine accelerates from rest to synchronous speed, the frequency of rotation of the field and damper windings with respect to the armature winding decreases from line frequency to zero. Thus they induce corresponding armature current fluctuations. Since, however, the angular speed difference between the field poles and the rotating armature flux decreases inversely as the speed increases, the frequency of the positive sequence current in the armature winding remains constant and equal to the line frequency, while the frequency of the negative sequence armature current varies from that of the applied voltage in a direction opposite to the rotation of the primary rotating current at zero speed of the rotor to zero frequency at half speed and thereafter increases again and attains line frequency in the same direction as the rotation of the primary current at synchronous speed of the machine.

An object of the invention is to provide automatic means for controlling the field excitation circuit of a synchronous dynamo-electric machine in accordance with the negative sequence current induced in the armature circuit of the machine.

Another object is to provide an automatic controller of the aforementioned type which effects the energization of the field excitation circuit when the negative sequence current of the machine attains a given positive frequency.

Another object is to provide an automatic controller including a tuned circuit responsive to the frequency and rotation of the negative sequence current.

Another object is to provide a relay for a controller of the aforementioned type which is responsive to a variable frequency.

Another object is to provide a latched frequency relay which is responsive to a change in frequency of the current to which it is subjected, whereby it has the characteristic of remaining closed during low current at half speed of the dynamo-electric machine, but opens as synchronous speed is approached.

Other objects and advantages will hereinafter appear.

The accompanying drawings are illustrative of an embodiment of the invention.

In the drawings, Figure 1 is a connection diagram illustrative of an automatic starting and synchronizing system for a synchronous dynamo-electric machine constructed in accordance with the present invention.

Figs. 2 and 3 are diagrams of the positive and negative sequence currents in the armature winding.

Figs. 4 and 5 are diagrams of the voltages induced in a network tuned to respond to the negative sequence currents flowing in the armature winding of the machine.

Figure 6:
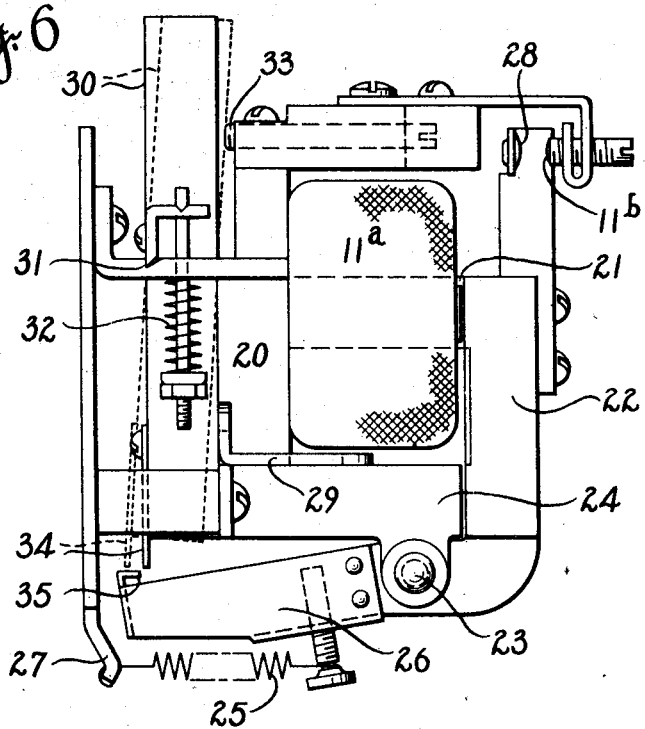
Figs. 6 and 7 are side and front views respectively of a relay forming part of the system shown in Fig. 1.

Referring to Fig. 1, the same illustrates a synchronous dynamo-electric machine 1 having an armature 1$^a$ and a field excitation winding 1$^b$. The armature may be supplied with current from the polyphase lines L$^1$, L$^2$ and L$^3$, said supply being controlled by the normally open main contacts 2$^b$, 2$^c$, 2$^d$, respectively, of an electromagnetic main switch 2, which is also provided with an energizing winding 2$^a$ and normally open auxiliary contacts 2$^e$ and 2$^f$.

Connected to the lines L$^1$ and L$^2$ are the primary windings of the current transformers 4 and 3, respectively. The secondary windings of said transformers are connected in parallel to form the two legs of a Y-connection. Connected in series with said secondary windings 3 and 4 are the primary windings 5$^a$ and 6$^a$, respectively, of current transformers 5 and 6 which are also provided with secondary windings 5$^b$ and 6$^b$, respectively. Depending upon the phase rotation of the system to which it is connected, the connection of one of the secondary windings is reversed such that the voltage drop at line frequency is of the same direction (with reference to point $x$ in Fig. 1) and equal as shown in Fig. 4, resulting in zero drop across the relay coil 11$^a$. The common terminals of the primary and secondary windings of the two transformers 5 and 6 and of the secondary windings of transformers 3 and 4 are connected together and are preferably grounded, as shown at $x^1$.

A frequency responsive tuned load circuit is connected to the series transformers as follows: Connected between the free terminal of the winding 5$^b$ and the common terminal, which latter is preferably grounded, is a condenser 7, an inductance 8 and a resistor 9. Connected across the common terminal and the free terminal of the winding 6$^b$ is a resistor 10. The resistor 10 is preferably of a value equal to the total impedance of the condenser 7, inductance 8, and resistor 9, when the current passing therethrough is of line frequency. Furthermore, the total ohmic resistance of the resistor 9 is $$\frac{1}{\sqrt{3}}$$

times the resultant impedance of the condenser 7 and inductance 8, and is therefore also equal to one-half of the value of the resistor 10.

Connected across the aforementioned free terminals of the windings 5$^b$ and 6$^b$; that is, across the open end of the V, is the energizing winding 11$^a$ of a relay 11. The relay 11 is provided with normally closed contacts 11$^b$ and the winding 11$^a$ is preferably paralleled by an adjustable resistor 12 to provide for adjustment of response of the relay.

The system is supplied with direct current from a source L$^{11}$, L$^{12}$ which furnishes energizing current for the winding 1$^b$.

The controller further includes the normally open starting pushbutton switch 13, and a normally closed stop pushbutton switch 14. They are connected between the line L$^2$ and one terminal of the winding 2$^a$. The other terminal of said winding is connected through a normally closed contact 15$^b$ of a thermal switch 15 to the line L$^1$. The switch 15 has a heater 15$^a$, which when heated by passage of current for a sufficient length of time deflects a thermally responsive element 15$^c$, which latter is arranged to open the normally closed contact 15$^b$ upon being deflected by the heater 15$^a$. The heater 15$^a$ is connected through the normally closed auxiliary contact 16$^e$ of a switch 16 and the normally open contact 2$^f$ across the lines L$^1$ and L$^2$. The switch 16 is further provided with an energizing winding 16$^a$, normally open main contacts 16$^b$ and 16$^c$ and normally closed auxiliary contact 16$^d$. The energizing winding 16$^a$ is connected in series with the contact 11$^b$ and the contact 2$^f$ across the lines L$^1$ and L$^2$. The contacts 16$^b$ and 16$^c$, when closed, connect the winding 1$^b$ across the direct current lines L$^{11}$ and L$^{12}$. The normally closed contact 16$^d$ connects a discharge resistor 17 across the winding 1$^b$ when the latter is disconnected from the direct current supply lines L$^{11}$, L$^{12}$.

Figure 7:
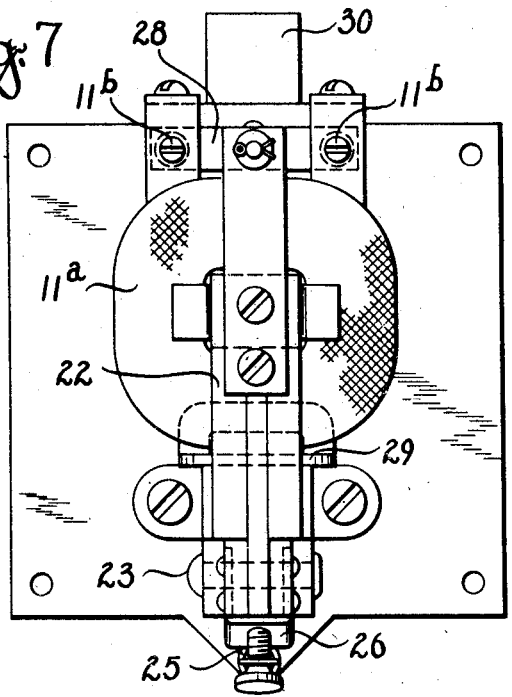

Referring now to Figs. 6 and 7, the relay 11 comprises a U-shaped laminated magnetizable frame 20, on one limb 21 of which is mounted the magnetizing coil 11$^a$, while a main armature 22 is pivotally supported at the pivot 23, attached to the outer end of the other limb 24 of the magnet frame. The armature 22 is biased away from the frame by an adjustable spring 25 interposed between a rearward extension 26 of the armature 22 and a stationary hook 27. A bridging contact 28 is attached to and insulated from the free end of the armature 22. The bridging contact is adapted to bridge a pair of fixed stationary contacts 11$^b$ when the armature is in its biased position. A short-circuited winding 29, preferably composed of sheet copper embraces the frame 20 at a zone of the frame outside of the coil 11$^a$. An auxiliary armature 30 is pivotally mounted at 31, the pivot being located at the rear of the frame 20 opposite to the direction of the limbs 21 and 24. The armature 30 is biased in a clockwise direction by a pair of adjustable springs, one of which is shown at 32, while its movement is limited by an adjustable stop 33. At its lower end the armature 30 is provided with an abutment 34, which is adapted to be engaged by an abutment 35 on the extension 26, when the armature 22 is released from its attracted position after the armature 30 has been released, thus preventing engagement of bridging contact 28 with stationary contacts 11$^b$. At low frequencies, the choking effect of the coil 29 is small, resulting in little or no flux through the auxiliary or latch armature 30. When the current in coil $11^a$ is low or of zero value, regardless of the frequency both armatures are, of course, released and tend to return to their biased positions.

When the frequency of the current in coil $11^a$ is relatively high, the inductive effect of the short-circuiting coil 29 is also high and induces a relatively large secondary magnetic flux around the coil 29 and through the armature 30. This flux pulls the auxiliary armature 30 into the attracted position shown in full lines in Fig. 6, thereby permitting release of the main armature 22, with consequent closure of contacts $11^b$ as the current decreases to a given value under the aforementioned condition of high frequency. However, as the frequency decreases the secondary flux decreases, thus ultimately releasing armature 30 to the dotted line position, thereby preventing armature 22 from dropping out to bridge contacts $11^b$ at half speed of the rotor.

The armature 30 is extended upwardly a relatively large distance beyond pivot 31 to increase its mass and the resulting period of free vibration to delay its response to an alternating flux of very low frequency and thus prevent it from oscillating at such a frequency, for the purpose to be explained hereinafter. If designed for a line frequency of 60 cycles, the relay is so adjusted that at frequencies below 35 cycles the current at which the auxiliary armature drops out is higher than that at which the main armature is released (whereby abutment 34 on auxiliary armature 30 is moved to its dotted line position, Fig. 6), thus insuring that on decreasing current under these conditions the relay contacts remain open (by reason of the action of abutment 34 which latches main armature 22 in the position shown). On the other hand, at higher frequencies the main armature 22 drops out at a higher current than the auxiliary armature 30, thus permitting the relay contacts $11^b$, 28 to close on decreasing current, the latch or abutment 34 being rendered ineffective, as will be apparent from the full line showing in Fig. 6.

The current flowing through the relay coil $11^a$ depends upon the voltage and frequency impressed upon the impedance of the tuned load circuit of the series transformer circuit. The constants of the external load are selected as aforedescribed. The positive sequence currents are shown in Fig. 2, where $I_{p}1$ is the current in winding $6^b$ and $I_{p}2$ is that of winding $5^b$, while their phase rotation is indicated by the arrow. As illustrated in Fig. 4, the current $I_{p}1$ causes voltage drop $V_{6b}$ in the resistor 10, which voltage is in phase with $I_{p}1$. The current $I_{p}2$ reversed produces in the resistor 9 a voltage drop $V_9$ and in the condenser 7 and inductance 8 a resultant voltage $V_{7-8}$. The resultant $V_{(7-8-9)}$ of the latter two voltages is equal to $V_{6b}$, so that the voltage on the terminals of the coil $11^a$ due to the positive sequence current is zero.

The negative sequence currents in the series transformer circuit are shown in Fig. 3, wherein $I_n1$ is the current in winding $6^b$ and $I_n2$ is that in winding $5^b$. As shown in Fig. 5, the former produces a voltage drop $V_{6b}$ in resistor 10, while the latter reversed causes a non-inductive drop of $V_9$ in resistor 9 and an inductive drop $V_{(7-8)}$, resulting in a total voltage $V_{5b}$. The voltage impressed on the relay at zero speed is thus $V_{11a}$, which is twice the inductive drop. As the frequency of the negative sequence current decreases with increased speed of the machine, the inductive component of the voltage at first increases, but as the negative sequence current decreases at the approach of half speed that inductive component will reach a maximum from which it will decrease to zero at half speed and hence the current which passes through the relay becomes very small. As the machine reaches half speed the frequency of the negative sequence current in the armature becomes zero and with further increases in speed increases again to line frequency when the machine runs synchronously. Hence the variable frequency negative sequence current induces in the relay coil $11^a$ a current which also varies in frequency and magnitude and is zero at full speed of the machine.

To start the machine the pushbutton 13 is depressed. This energizes the coil $2^a$ and the switch 2 closes its main contacts $2^b$, $2^c$ and $2^d$ and connects the armature $1^a$ to the lines $L^1$, $L^2$, $L^3$. At the same time the contacts $2^e$ close a maintaining circuit in parallel with the contact 13 and switch 2 remains energized, until opening of either the pushbutton switch 14 or the contacts $15^b$ of switch 15. Upon closure of switch $2^a$ current is induced in the transformers 3 and 4 and flows through the transformers 5 and 6 and the tuned circuit as aforedescribed. The voltage $V_{11a}$ (see Fig. 5) energizes the relay coil $11^a$ and the relay opens the contacts $11^b$. Shortly thereafter the contact $2^f$ closes. As the machine accelerates the relay 11 again closes the contacts $11^b$ when the negative sequence current approaches zero near synchronous speed of the machine. This energizes the coil $16^a$ which connects the motor field $1^b$ across the lines $L^{11}$, $L^{12}$ and opens the field short-circuit through the resistor 17. Thereupon the machine pulls into synchronism.

It should be pointed out that when the negative sequence current frequency and the magnitude of the current through relay coil $11^a$ approach zero at half synchronous speed of the machine, the armature 30 is released before the armature 22, because little flux passes through the former, so that the latter cannot close the contacts $11^b$, due to interference of abutments 34 and 35. On the other hand, when the relay current approaches zero at the time when the motor is near synchronous speed, the frequency of the relay current being high, the armature 30 is attracted and the armature 22 is released to close the contacts $11^b$, thus preventing the locking in of armature 22 in the contact open position.

If the machine after having been synchronized pulls out of step, a negative sequence current is again induced, resulting in a high voltage on the coil $11^a$, which causes the relay 11 to open contacts $11^b$. This interrupts the field excitation, and if the machine load decreases the machine is again synchronized as aforedescribed.

If the field circuit is not closed within a given interval after closure of the main switch 2, the current passing from line $L^1$, through resistor $15^a$, and contacts $16^e$ and $2^f$ to line $L^2$ flexes the element $15^c$ and this in turn opens contacts $15^b$ and deenergizes the coil $2^a$ to open switch 2, thus disconnecting the machine from lines $L^1$, $L^2$ and $L^3$ until both the switch $15^b$ is reclosed upon cooling of the resistor $15^a$ and the pushbutton 13 is depressed.

The system may also be employed for starting synchronous machines at reduced voltage as will be readily apparent.

It will be obvious that the current transformers 3 and 4 may be omitted and the primary windings of transformers 5 and 6 connected directly in circuit with the armature 1a.

I claim:

1. In a controller for a synchronous dynamo-electric machine having an armature and a field winding, the combination with electromagnetic switching means including an energizing winding and means adapted to complete a short-circuit for a field winding of a synchronous dynamo-electric machine and alternately to open said short-circuit and complete an exciting circuit for supplying said field winding with exciting current, of two current transformers, each having a primary winding and a secondary winding, one each of said primary windings connectable to one of the terminals of the armature winding of a synchronous dynamo-electric machine, to be subjected to an influence of the armature current, the secondary windings of said transformers and the aforementioned energizing winding of said switching means being connected to form the three sides of a delta-connected network, a non-inductive resistor connected in parallel with one of said secondary windings, and a condenser, an inductance and a resistor connected in series with each other and in parallel with the other of said secondary windings, said delta-connected network being adapted to respond to the frequency and rotation of the voltages induced in said secondary windings by currents flowing in said primary windings of said transformers to bias said electromagnetic switching means to effect said short-circuit and alternately to complete said exciting circuit.

2. In a controller for a synchronous dynamo-electric machine having an armature and a field winding, the combination with electromagnetic switching means including an energizing winding and means to short-circuit said field winding and alternately to connect it to an energizing source, of two current transformers each having a primary winding and a secondary winding, one each of said primary windings being connectable in series with one of the terminals of said armature winding, the secondary windings of said transformers and the aforementioned energizing winding of said switching means being connected to form the three sides of a delta-connected network, a non-inductive resistor connected in parallel with one of said secondary windings, and a condenser, an inductance and a resistor connected in series with each other and in parallel with the other of said secondary windings, said delta-connected network being responsive to the frequency of the negative sequence voltage induced in said armature circuit to bias said electromagnetic switching means to provide for short-circuiting of said field winding when the speed of said machine is substantially below synchronous speed and to alternately open said short-circuit of said field winding and connect it to an energizing source when the speed of said dynamo-electric machine approaches synchronous speed.

3. In a controller for a synchronous dynamo-electric machine having an armature and a field winding, the combination with said machine of electromagnetic switching means including an energizing winding and means to short-circuit said field winding and alternately to connect it to an energizing source, two current transformers each having a primary winding and a secondary winding, one each of said primary windings being connectable in series circuit with one of the terminals of said armature winding, the secondary windings of said transformers and the aforementioned energizing winding of said switching means being connected to form the three sides of a delta-connected network, a non-inductive resistor connected in parallel with one of said secondary windings, and a condenser, an inductance and a resistor connected in series with each other and in parallel with the other of said secondary windings, said delta-connected network being responsive to the magnitude and frequency of the negative sequence voltage induced in said armature circuit to bias said electromagnetic switching means to provide for short-circuiting of said field winding when the speed of said machine is substantially below synchronous speed and to alternately open said short-circuit of said field winding and connect it to an energizing source when the speed of said dynamo-electric machine approaches synchronous speed.

4. In a controller for a synchronous dynamo-electric machine having an armature and a field winding, the combination with electromagnetic switching means adapted to complete a short-circuit for a field winding of a synchronous dynamo-electric machine and alternately to open said short-circuit and complete an exciting circuit for supplying said field winding with exciting current, of an electromagnetic relay, having an energizing winding and adapted to control the operation of said electromagnetic switching means, two current transformers, each having a primary winding and a secondary winding, one each of said primary windings being connectable to one of the terminals of the armature winding of a synchronous dynamo-electric machine to be subjected to an influence of the armature current, the secondary windings of said transformers and the energizing winding of said electromagnetic relay being connected to form the three sides of a delta-connected network, a non-inductive resistor connected in parallel with one of said secondary windings, and a condenser, an inductance and a resistor connected in series with each other and in parallel with the other of said secondary windings, said delta-connected network being adapted to respond to the frequency and rotation of the voltages induced in said secondary windings by currents flowing in said primary windings of said transformers to control the operation of said electromagnetic relay.

5. A controller comprising the combination with a synchronous dynamo-electric machine having an armature and a field winding, and electromagnetic switching means adapted to complete a short-circuit for a field winding of a synchronous dynamo-electric machine and alternately to open said short-circuit and complete an exciting circuit for supplying said field winding with exciting current, of an electromagnetic relay, having an energizing winding and adapted to control the operation of said edectromagnetic switching means, two current transformers, each having a primary winding and a secondary winding, one each of said primary windings being connected to one of the terminals of the armature winding of a synchronous dynamo-electric machine to be subjected to an influence of the armature current, the secondary windings of said transformers and the energizing winding of said electromagnetic relay being connected to form the three sides of a delta-connected network, a non-inductive resistor connected in parallel with one of said secondary windings, and a condenser, an inductance and a resistor connected in series with each other and in parallel with the other of said secondary windings, said delta-connected network being adapted to respond to the frequency and rotation of the voltages induced in said secondary windings by currents flowing in said primary winding of said transformers to control the operation of said electromagnetic relay.

6. A controller comprising the combination with a synchronous dynamo-electric machine having an armature and a field winding, electromagnetic switching means adapted to complete a short-circuit for a field winding of a synchronous dynamo-electric machine and alternately to open said short-circuit and complete an exciting circuit for supplying said field winding with exciting current, and a pair of current transformers each having a primary winding connectable in series with one of the terminals of said armature winding, and a secondary winding, of an electromagnetic relay having an energizing winding and adapted to control the operation of said electromagnetic switching means, a second pair of transformers each one having a primary winding connected in series with the secondary winding of one of the first transformers and a secondary winding, the secondary windings of said second pair of transformers and the energizing winding of said electromagnetic relay being connected to form the three sides of a delta-connected network, a non-inductive resistor connected in parallel with one of said secondary windings, and a condenser, an inductance and a resistor connected in series with each other and in parallel with the other of said secondary windings, said delta-connected network being adapted to respond to the frequency and rotation of the voltages induced in said secondary windings of said second pair of transformers by currents flowing in said primary windings of said first pair of transformers to control the operation of said electromagnetic relay.

7. In a controller for a synchronous dynamo-electric machine having an armature and a field winding, the combination with electromagnetic switching means adapted to complete a short-circuit for a field winding of a synchronous dynamo-electric machine and alternately to open said short-circuit and complete an exciting circuit for supplying said field winding with exciting current, of a frequency responsive electromagnetic relay having a magnetic frame, a main energizing coil mounted on said frame to induce a magnetic flux therein, a secondary coil mounted on said frame to induce therein a secondary magnetic flux, a main armature movable to an attracted position under the influence of said first mentioned flux, an auxiliary armature movable to an attracted position under an influence of said secondary flux, individual biasing means adapted to normally move said armatures to a released position, said secondary coil and said biasing means of said armatures being proportioned and arranged to effect release of said main armature at a current which is higher than the current of release of said auxiliary armature when the frequency of said exciting current is relatively high and to effect release of said main armature at a current which is lower than the current of release of said auxiliary armature when the frequency of said exciting current is relatively low, interlocking means for said armatures adapted to prevent release of either armature from its attracted position when the other armature is in the released position, but to permit at all times movement of either armature from its released to its attracted position, and a contact operable by said main armature to control operation of said electromagnetic switching means, two current transformers each having a primary winding and a secondary winding, one each of said primary windings being connectable to one terminal of the armature winding of a synchronous dynamo-electric machine to be subjected to an influence of the armature current, the secondary windings of said transformers and the energizing winding of said electromagnetic relay being connected to form three sides of a delta-connected network, a non-inductive resistor connected in parallel with one of said secondary windings, and a condenser, an inductance and a resistor connected in series with each other and in parallel with the other of said secondary windings, said delta-connected network being adapted to respond to the frequency and rotation of the voltages induced in said secondary windings by currents flowing in said primary windings of said transformers.

8. A frequency responsive electromagnetic relay comprising the combination with a magnetic frame of a main energizing coil mounted on said frame and adapted to receive a current of variable magnitude and frequency and to induce a magnetic flux in said frame, a secondary coil mounted on said frame and arranged to induce therein a secondary magnetic flux, a main armature movable to an attracted position under the influence of said first mentioned flux, an auxiliary armature movable to an attracted position under an influence of said secondary flux, individual biasing means adapted to normally move each of said armatures to a released position, said secondary coil and said biasing means of said armatures being proportioned and arranged to effect release of said main armature at a current which is higher than the current of release of said auxiliary armature when the frequency of said exciting current is relatively high, and to effect release of said main armature at a current which is lower than the current of release of said auxiliary armature when the frequency of said exciting current is relatively low, and interlocking means adapted to prevent release of either armature from its attracted position when the other armature is in the released position, but to permit at all times movement of either armature from its released to its attracted position.

9. In a controller for a synchronous dynamo-electric machine having an armature and a field winding, the combination with electromagnetic switching means including an energizing winding and means adapted to complete a short-circuit for a field winding of a synchronous dynamo-electric machine and alternately to open said short-circuit and complete an exciting circuit for supplying said field winding with exciting current, of two current transformers, each having a primary winding and a secondary winding, one each of said primary windings being connectable to one of the terminals of the armature winding of a synchronous dynamo-electric machine, to be subjected to an influence of the armature current, the secondary windings of said transformers and the aforementioned energizing winding of said switching means being connected to form the three sides of a delta-connected network, a non-inductive resistor connected in parallel with one of said secondary windings, and a condenser, an inductance and a resistor connected in series with each other and in parallel with the other of said secondary windings, said condenser, inductance and resistor being of such relative values that the voltage drop across the same jointly within said network is equal to and in phase with that of said non-inductive resistor for the positive sequence current, whereby said delta-connected network is adapted to respond to the frequency and rotation of the voltages induced in said secondary windings by currents flowing in said primary windings of said transformers to bias said electromagnetic switching means to effect said short-circuit and alternately to complete said exciting circuit.

10. In a controller for a synchronous dynamo-electric machine having an armature and a field winding, the combination with electromagnetic switching means adapted to complete a short-circuit for a field winding of a synchronous dynamo-electric machine and alternately to open said short-circuit and complete an exciting circuit for supplying said field winding with exciting current, of a frequency responsive electromagnetic relay having a magnetic frame, a main energizing coil mounted on said frame to induce a magnetic flux therein, a secondary coil mounted on said frame to induce therein a secondary magnetic flux, a main armature movable to an attracted position under the influence of said first mentioned flux, an auxiliary armature movable to an attracted position under an influence of said secondary flux, individual biasing means adapted to normally move said armatures to a released position, said secondary coil and said biasing means of said armatures being proportioned and arranged to effect release of said main armature at a current which is higher than the current of release of said auxiliary armature when the frequency of said exciting current is relatively high and to effect release of said main armature at a current which is lower than the current of release of said auxiliary armature when the frequency of said exciting current is relatively low, interlocking means for said armatures adapted to prevent release of either armature from its attracted position when the other armature is in the released position, but to permit at all times movement of either armature from its released to its attracted position, and a contact operable by said main armature to control operation of said electromagnetic switching means, two current transformers each having a primary winding and a secondary winding, one each of said primary windings being connectable to one terminal of the armature winding of a synchronous dynamo-electric machine to be subjected to an influence of the armature current, the secondary windings of said transformers and the energizing winding of said electromagnetic relay being connected to form three sides of a delta-connected network, and control elements respectively connected in parallel with said secondary windings, whereby said delta-connected network is adapted to respond to the frequency and rotation of the voltages induced in said secondary windings by currents flowing in said primary windings of said transformers.

ERIC PELL.